United States Patent
Hill et al.

(10) Patent No.: US 11,110,584 B2
(45) Date of Patent: Sep. 7, 2021

(54) JIGSAW BLADE STORAGE

(71) Applicant: BLACK & DECKER INC., New Britain, CT (US)

(72) Inventors: Jesse P. Hill, Baltimore, MD (US); James W. Richards, Baltimore, MD (US); Drake L. Fisher, Baltimore, MD (US); Brent A. Kuehne, Red Lion, PA (US)

(73) Assignee: Black & Decker Inc., New Britain, CT (US)

( * ) Notice: Subject to any disclaimer, the term of this patent is extended or adjusted under 35 U.S.C. 154(b) by 5 days.

(21) Appl. No.: 15/783,221

(22) Filed: Oct. 13, 2017

(65) Prior Publication Data

US 2018/0133886 A1     May 17, 2018

Related U.S. Application Data

(60) Provisional application No. 62/423,543, filed on Nov. 17, 2016.

(51) Int. Cl.
     *B25F 5/02*      (2006.01)
     *B23D 49/16*      (2006.01)
     *B23D 51/03*      (2006.01)
     *B23D 51/00*      (2006.01)

(52) U.S. Cl.
     CPC ............ *B25F 5/029* (2013.01); *B23D 49/162* (2013.01); *B23D 51/00* (2013.01); *B23D 51/03* (2013.01)

(58) Field of Classification Search
     CPC ....... B26F 5/029; B23D 49/162; B23D 51/03; B23D 51/00
     See application file for complete search history.

(56) References Cited

U.S. PATENT DOCUMENTS

| | | | |
|---|---|---|---|
| 2,452,148 A | 10/1948 | Rhodes | |
| 3,353,573 A | 11/1967 | Hitzeroth | |
| 4,614,037 A * | 9/1986 | Somers .................. | B23D 51/03 30/125 |
| 6,189,217 B1 * | 2/2001 | Melvin .................. | B23D 51/03 30/125 |
| 6,302,406 B1 * | 10/2001 | Ventura .................. | B23D 49/16 279/48 |
| 6,357,123 B1 * | 3/2002 | Manuel ................ | B23D 51/025 30/374 |
| 6,877,234 B2 | 4/2005 | Saegesser et al. | |
| 10,029,322 B2 * | 7/2018 | Van Wambeke ..... | B23D 49/162 |
| 2004/0172833 A1 * | 9/2004 | Tam ...................... | B23D 49/162 30/124 |
| 2005/0252007 A1 * | 11/2005 | Critelli .................... | B23D 49/12 30/166.3 |
| 2006/0143928 A1 * | 7/2006 | Wu ........................ | B23D 51/03 30/124 |
| 2006/0168824 A1 * | 8/2006 | Roberts ................ | B23D 49/162 30/374 |

(Continued)

*Primary Examiner* — Ghassem Alie
*Assistant Examiner* — Fernando A Ayala
(74) *Attorney, Agent, or Firm* — Stephen R. Valancius

(57) ABSTRACT

A power tool including a housing with two housing halves joined together at a joining line. A motor housed in the housing. A blade holder which is driven by the motor and is configured to hold a blade so as to cut an object with the blade. A blade storage compartment configured to hold the blade when the blade is not in use for cutting. The blade storage compartment is formed by the two housing halves.

20 Claims, 5 Drawing Sheets

(56) References Cited

U.S. PATENT DOCUMENTS

| | | | |
|---|---|---|---|
| 2008/0245198 A1 | 10/2008 | Chen | |
| 2009/0077814 A1* | 3/2009 | Gibbons | B23D 49/167 30/376 |
| 2009/0077818 A1 | 3/2009 | Van Wambeke et al. | |
| 2009/0094838 A1* | 4/2009 | Chan | B23D 51/03 30/161 |
| 2012/0317823 A1* | 12/2012 | Vantran | B23D 51/10 30/376 |
| 2013/0019483 A1* | 1/2013 | Naughton | B23D 49/162 30/376 |

* cited by examiner

JIGSAW BLADE STORAGE

CROSS-REFERENCE TO RELATED APPLICATIONS

This application claims the benefit of U.S. Provisional Application No. 62/423,543, filed on Nov. 17, 2016, entitled JIGSAW BLADE STORAGE. The entire contents of U.S. Provisional Application No. 62/423,543 are incorporated herein by reference.

FIELD OF THE INVENTION

The present invention relates to power tools, particularly to jigsaws and a blade storage for a jigsaw.

BACKGROUND

There are various existing jigsaws with blade storage. It is desired to provide a jigsaw with a blade storage which can hold a blade for storage in a simple and efficient manner.

SUMMARY

According to an aspect of an exemplary embodiment there is a power tool comprising a housing comprising two housing side shells joined together at a joining line. A motor is housed in the housing. A blade holder is driven by the motor and is configured to hold a blade so as to cut an object with the blade. A blade storage compartment configured to hold the blade when the blade is not in use for cutting. The blade storage compartment is formed by the two housing side shells.

The blade storage compartment is formed at the joining line.

The power tool may further include a shoe. The housing may include an upper housing portion and a lower housing portion. The motor is contained in the upper housing portion and wherein the lower housing portion is located between the upper housing portion and the shoe.

The blade storage compartment may be formed in the lower housing portion.

The lower housing portion may include a through hole in which the blade is visible when stored in the blade storage compartment.

The through hole may extend through both of the two housing side shells.

The housing may be made of plastic.

The shoe may be made of metal.

The blade may be held in the blade storage compartment by a frictional fit.

The blade may include a first section of a first width and a second section of a second width, larger than the first width and the opening of the blade storage compartment may be larger than the first width, but smaller than the second width.

The second width may be provided by a projection.

According to another aspect, there is an exemplary embodiment including a powered saw with a housing having two housing halves joined together at a joining line. A motor is housed in the housing. A blade holder is driven by the motor and is configured to hold a blade so as to cut an object with the blade. A blade storage compartment is configured to hold the blade when the blade is not in use for cutting. The blade storage compartment is formed at the joining line.

The powered saw may further comprise a battery pack which provides power to the motor. The battery pack may cross the joining line.

The blade may be held in the blade storage compartment by a frictional fit.

The powered saw may further include a shoe. The housing comprises an upper housing portion and a lower housing portion. The motor is contained in the upper housing portion. The lower housing portion is located between the upper housing portion and the shoe. The blade storage compartment is formed in the lower housing portion.

The two housing halves may include a first housing half which is integrally molded and includes a first part of the upper housing portion and a first part lower housing portion. The two housing halves may also comprise a second housing half which is integrally molded and includes a second part of the upper housing portion and a second part of the lower housing portion.

According to another aspect, there is an exemplary embodiment including a powered saw with a housing comprising a first integrally molded housing part and a second integrally molded housing part, the first integrally molded housing part and the second integrally molded housing part meeting at a joining line and being secured together by at least one fastening element. A motor housed in the housing. A blade holder which is driven by the motor and is configured to hold a blade so as to cut an object with the blade. A blade storage compartment configured to hold the blade when the blade is not in use for cutting. The blade storage compartment is formed at the joining line.

The powered saw may further comprises a shoe. The first integrally molded housing part comprises a first part of an upper housing portion and a first part of a lower housing portion. The second integrally molded housing part may comprise a second part of the upper housing portion and a second part of the lower housing portion. The motor is contained in the upper housing portion. The lower housing portion is located between the upper housing portion and the shoe. The blade storage compartment is formed in the lower housing portion.

The blade may be held in the blade storage compartment by a frictional fit.

DETAILED DESCRIPTION OF EXEMPLARY EMBODIMENTS

The basic design of a jigsaw is well known. A jigsaw generally includes a housing which contains a motor. A trigger is provided so that the user can activate the motor and provide a reciprocating and/or orbital (pendulum) motion to a cutting blade holder which holds a jigsaw cutting blade.

Jigsaws may be powered by a battery pack (DC power/cordless) or through a cord (AC power/corded). A known jigsaw is shown in U.S. Patent Application Publication No. 2009/0077818, which is hereby incorporated by reference.

When a jigsaw is not being used, a user may want to store the cutting blade in blade storage. It may be helpful to have blade storage built into the jigsaw so that the user does not lose or misplace the cutting blade and it is easily accessible An exemplary embodiment according to the present application is shown in FIGS. 1-8. The exemplary embodiment illustrates a jigsaw 10. The jigsaw includes a housing 50 in which a motor 60 is housed. The housing 50 includes two housing side shells. In the exemplary embodiment, the housing side shells are halves 53 and 54 which are joined together to form the housing 50. As will be appreciated, the housing halves 53, 54 do not need to be precisely half of the housing. The housing halves 53 and 54 each form one side of the jigsaw 10 and meet at the joining line A shown in FIGS. 1, 2 and 8. Each of the two housing halves 53, 54 are formed as an integrally formed piece of plastic. The housing halves 53, 54 are held together by one or more fastening element. The fastening elements may be screws, rivets, an adhesive or the like.

Figure 1:
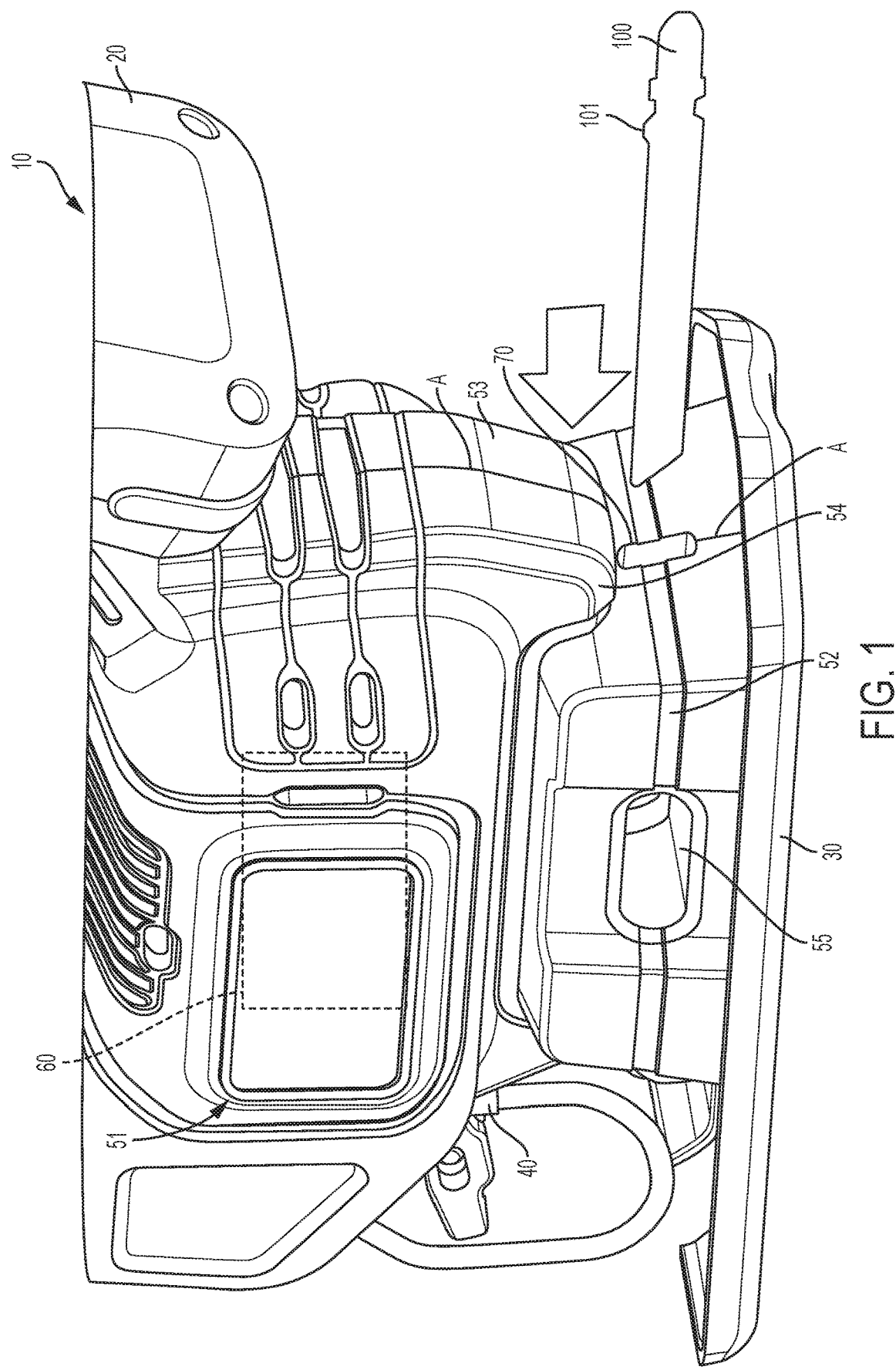
FIG. 1 is a perspective view of a portion of an exemplary embodiment of a jigsaw with blade storage.
Figure 2:
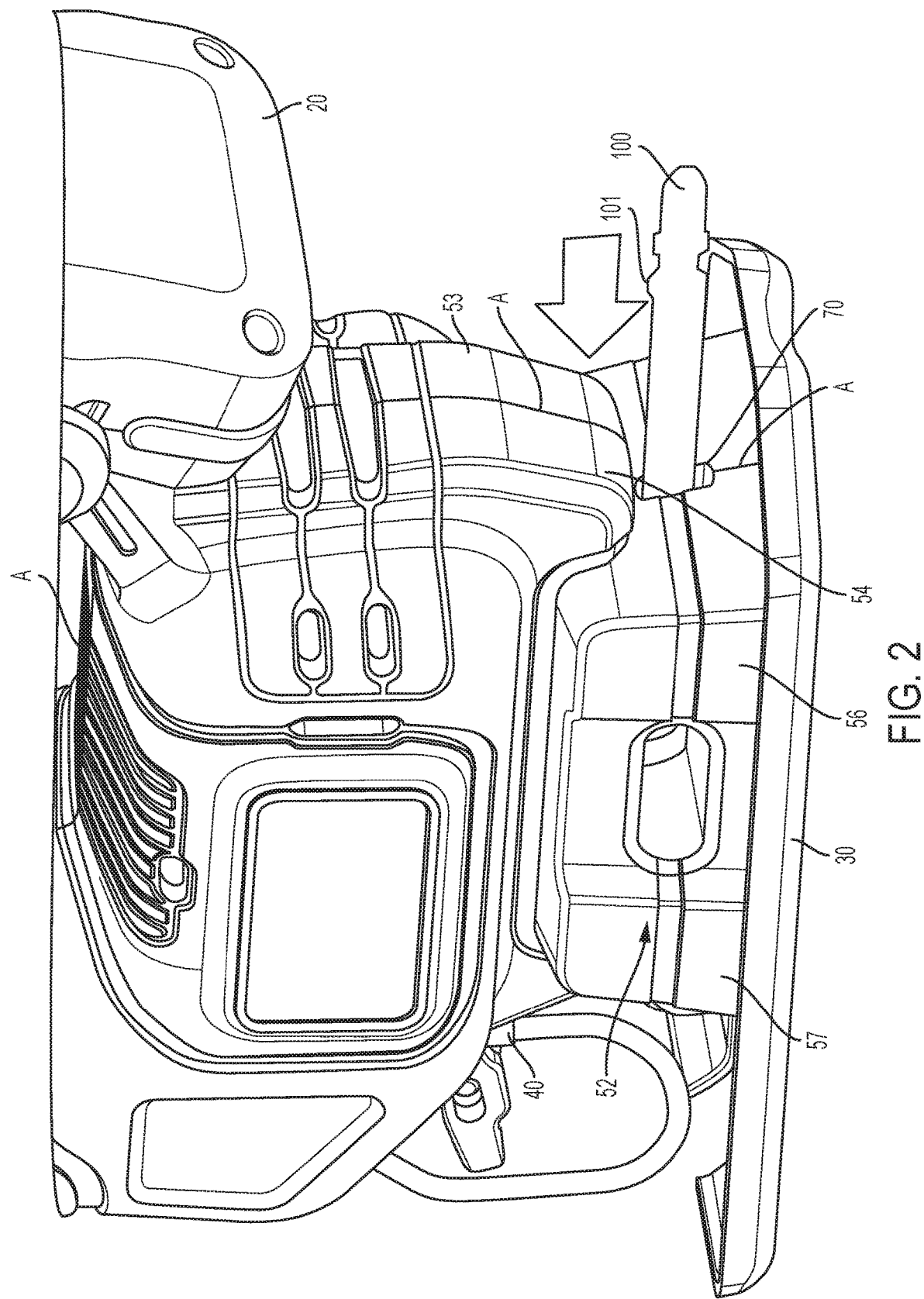
FIG. 2 is another perspective view of a portion of the exemplary embodiment of the jigsaw.

The motor 60 is shown schematically in FIG. 1. It will be appreciated that the motor 60 is located in an interior of the housing 50 at the location shown in FIG. 1. The jigsaw 10 is powered by a battery pack 20. A trigger 110 can be operated by the user to begin reciprocating and/or orbital motion of the cutting blade holder 40 and the user can hold the jigsaw by the handle 120. The jigsaw 10 also includes a shoe 30. The jigsaw 10 includes an upper housing portion 51 in which the motor is housed and a lower housing portion 52, which is located between the upper housing portion 51 and the shoe 30. The first housing half 53 forms part of the upper housing portion 51 and part of the lower housing portion 52. Likewise, the second housing half 54 forms part of the upper housing portion 51 and part of the lower housing portion 52.

Figure 3:
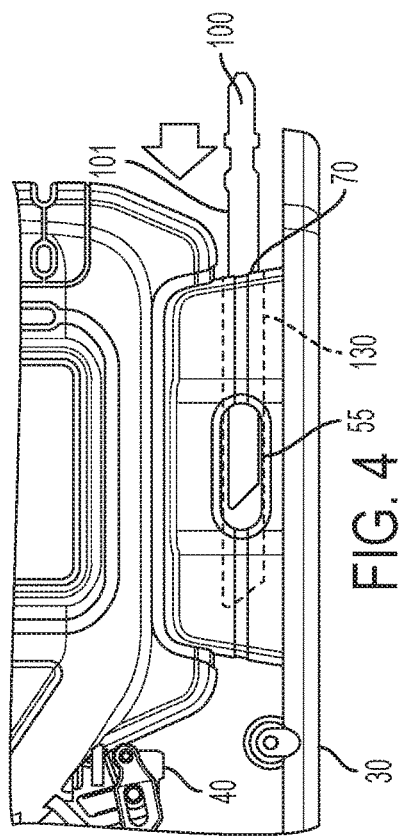
FIG. 3 is a side view of a portion of the exemplary embodiment of the jigsaw.
Figure 4:
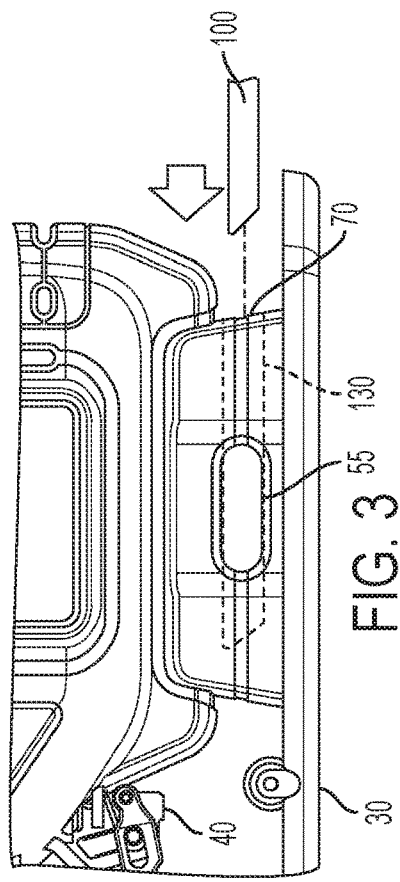
FIG. 4 is another side view a portion of the exemplary embodiment of the jigsaw.
Figure 5:
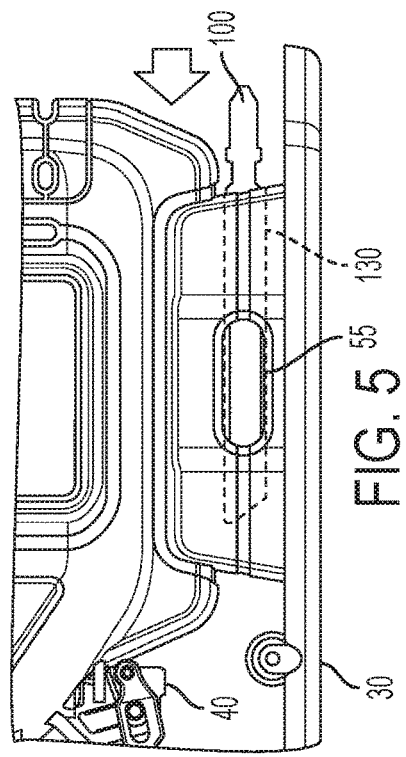
FIG. 5 is another side view a portion of the exemplary embodiment of the jigsaw.
Figure 7:
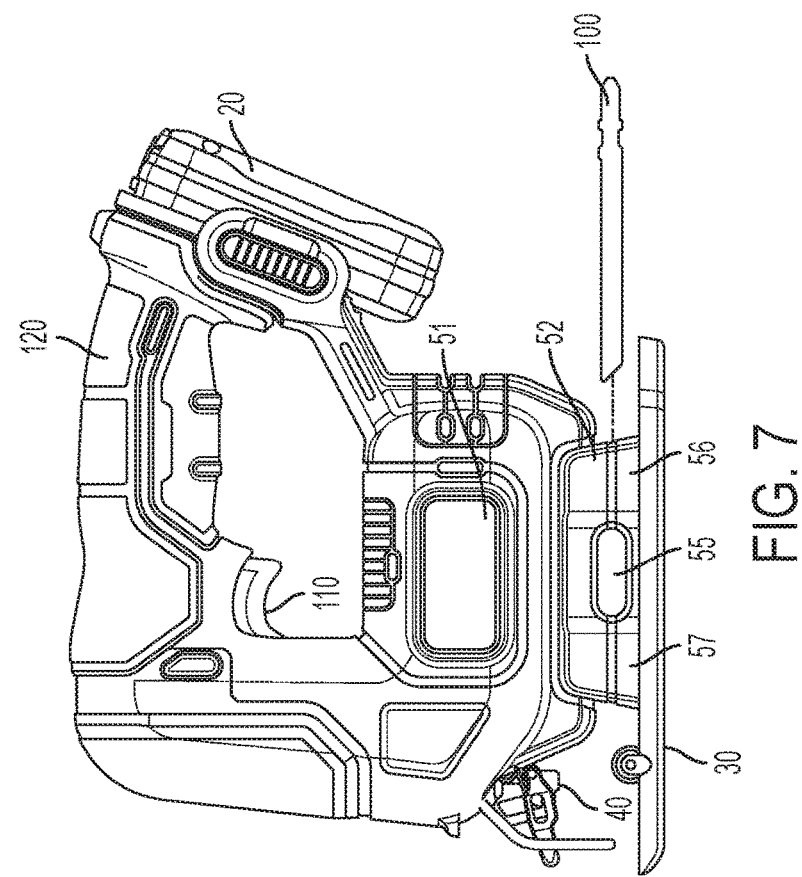
FIG. 7 is another side view of the exemplary embodiment of the jigsaw.
Figure 6:
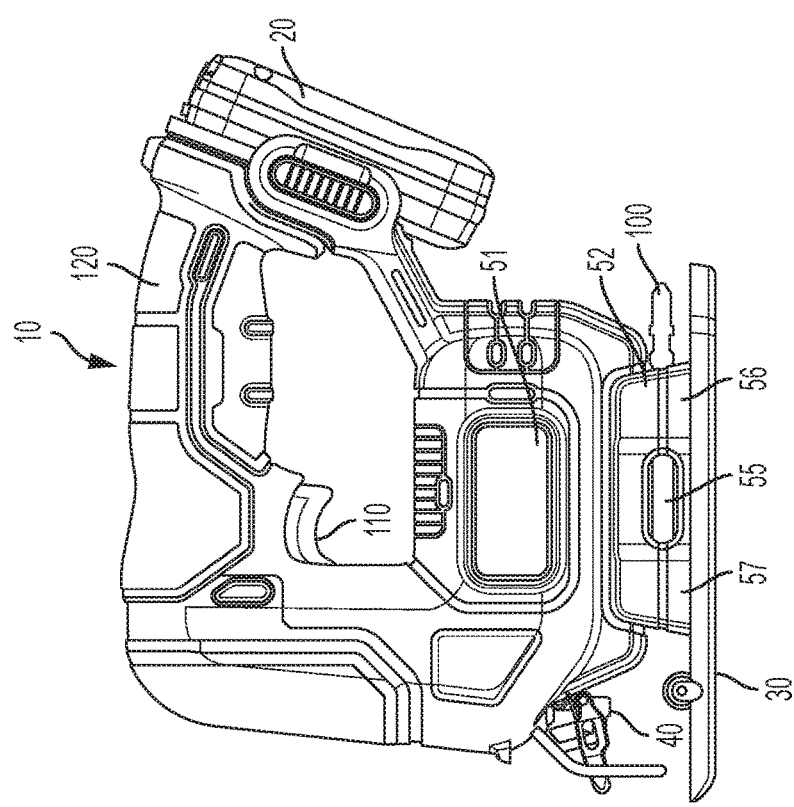
FIG. 6 is a side view of the exemplary embodiment of the jigsaw.
Figure 8:
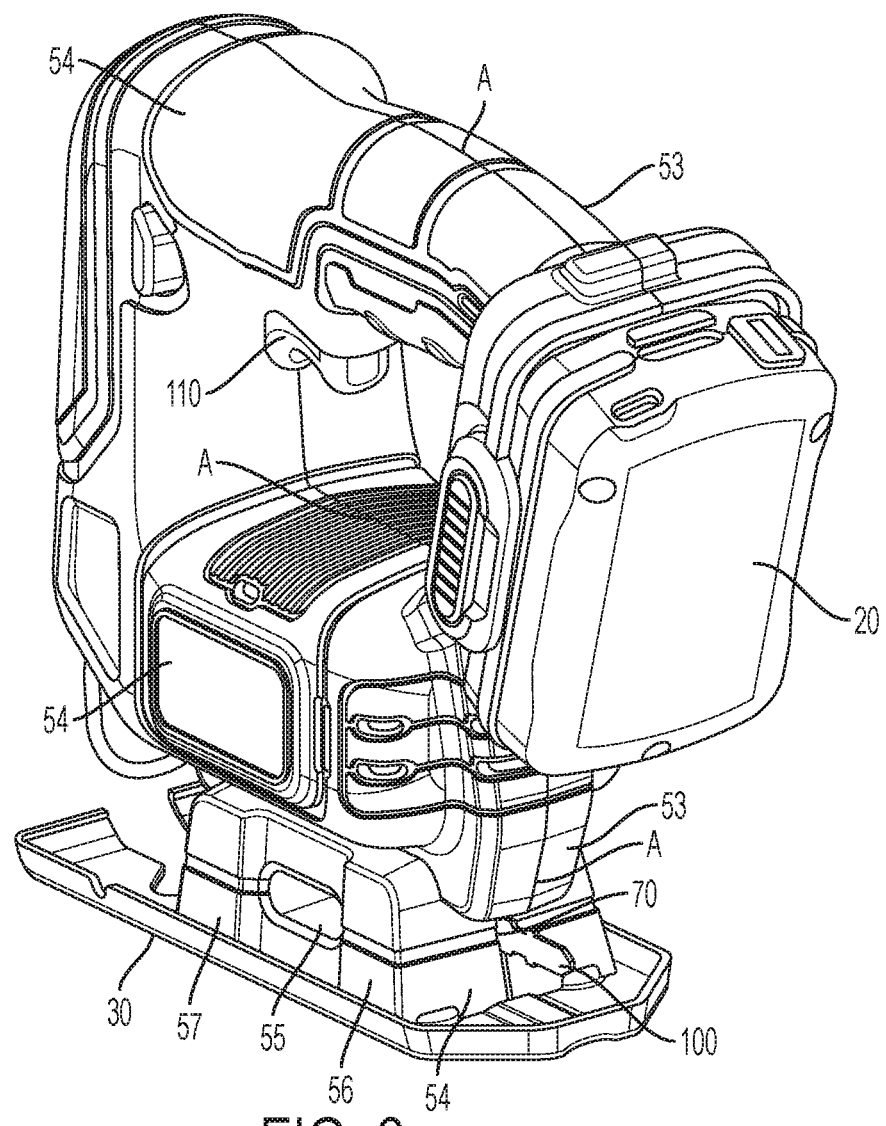
FIG. 8 is a rear perspective view of the exemplary embodiment of the jigsaw.

As shown in FIGS. 1-8, the lower housing portion 52 includes a slot 70 for inserting a blade 100 when the blade 100 is being stored. As shown, the blade is inserted into an opening 70 of a blade storage compartment at a rear of the lower housing portion 52. The blade storage compartment 130 is formed as a space between the first housing half 53 and the second housing half 54. The compartment 130 is sized to accommodate the blade 100 and is shown schematically in dashed lines in FIGS. 3-5. The opening 70 is sized to accommodate insertion of the blade 100 while providing a frictional fit to secure the blade. Particularly, the opening 70 is designed to be larger than the width W1 of the blade 100 at a cutting section and smaller than the width W2 of the blade 100 where the blade has a projection 101. In this manner, the blade 100 can be inserted until the projection 101 reaches the opening. This is shown in FIGS. 3-5 as the blade 100 is shown progressively inserted from FIG. 3 to fully inserted in FIG. 5.

As shown in, for example, FIGS. 3-5, the jigsaw 10 also includes a hole 55 in the lower housing portion 52. The hole 55 extends through both housing halves 53 and 54. As shown in FIGS. 3-5, when the blade 100 is fully inserted, the blade 100 can be seen through the hole 55.

The lower portion of the housing 52 in which the blade compartment is formed has a rear section 56 and a front section 57. As the blade is inserted to a storage position, a tip of the blade 100 passes through the rear section 56, through the opening 55 and ends in the front section 57.

The opening 70 is formed on the joining line A. In this way, the opening can be easily formed by molding the housing halves with space for the opening 70 between them. The opening can be formed by the housing half 53 alone, the housing half 54 alone or partly in each of the housing halves.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A power tool comprising: a housing comprising two housing side shells joined together at a joining line; a motor housed in the housing; a blade holder which is driven by the motor and is configured to hold a blade so as to cut an object with the blade; a shoe; and a blade storage compartment configured to hold the blade when the blade is not in use for cutting; wherein the blade storage compartment is formed by the two housing side shells; wherein the blade storage compartment is disposed between the motor and the shoe; wherein when the blade is held in the blade storage compartment it is not held by the blade holder; and wherein the blade is directly contacted and held by the two housing side shells.

2. The power tool of claim 1, wherein the blade storage compartment is formed at the joining line.

3. The power tool of claim 1,
wherein the housing comprises an upper housing portion and a lower housing portion;
wherein the motor is contained in the upper housing portion and wherein the lower housing portion is located between the upper housing portion and the shoe.

4. The power tool of claim 1, wherein the blade storage compartment is formed in a lower housing portion.

5. The power tool of claim 1, wherein a lower housing portion includes a through hole in which the blade is visible when stored in the blade storage compartment.

6. The power tool of claim 5, wherein the through hole extends through both of the two housing side shells.

7. The power tool of claim 1, wherein the housing is made of plastic.

8. The power tool of claim 1, wherein the shoe is made of metal.

9. The power tool of claim 1, wherein the blade is held in the blade storage compartment by a frictional fit.

10. The power tool of claim 1, further comprising a battery pack;
wherein the battery pack provides power to the motor;
wherein the blade holder is at a front of the power tool and the battery pack is at a rear of the power tool;
wherein the battery pack has a first end closest to the shoe and a second end, opposite the first end;
wherein when the blade is held in the blade storage compartment and the shoe is on a flat horizontal surface, the battery pack is rearward of the blade.

11. A powered saw comprising: a housing comprising two housing halves joined together at a joining line; a motor housed in the housing; a blade holder which is driven by the motor and is configured to hold a blade so as to cut an object with the blade; a blade storage compartment configured to hold the blade when the blade is not in use for cutting; wherein the blade storage compartment is formed at the joining line; wherein the blade storage compartment is formed by the two housing halves; wherein the powered saw further comprises a shoe; wherein the blade storage compartment is disposed between the motor and the shoe; wherein when the blade must be removed from the blade holder to be held in the blade storage compartment; and wherein the blade is directly contacted and held by the two housing halves.

12. The powered saw of claim 11, further comprising a battery pack which provides power to the motor; and
wherein the battery pack crosses the joining line.

13. The powered saw of claim 11, wherein the blade is held in the blade storage compartment by a frictional fit.

14. The powered saw of claim 11,
wherein the housing comprises an upper housing portion and a lower housing portion;
wherein the motor is contained in the upper housing portion;
wherein the lower housing portion is located between the upper housing portion and the shoe; and
wherein the blade storage compartment is formed in the lower housing portion.

15. The powered saw of claim 14, wherein the two housing halves comprise a first housing half which is integrally molded and includes a first part of the upper housing portion and a first part lower housing portion; and
wherein the two housing halves also comprises a second housing half which is integrally molded and includes a second part of the upper housing portion and a second part of the lower housing portion.

16. A powered saw comprising: a housing comprising a first integrally molded housing part and a second integrally molded housing part, the first integrally molded housing part and the second integrally molded housing part meeting at a joining line and being secured together by at least one fastening element; a motor housed in the housing; a blade holder which is driven by the motor and is configured to hold a blade so as to cut an object with the blade; a blade storage compartment separate from the blade holder, the blade storage compartment configured to hold the blade when the blade is not in use for cutting; wherein the blade storage compartment is formed at the joining line; wherein the blade storage compartment is formed by the first integrally molded housing part and the second integrally molded housing part; wherein when the blade is held in the blade storage compartment it is not held by the blade holder; and wherein the blade is directly contacted and held by the first integrally molded housing part and the second integrally molded housing part.

17. The powered saw of claim 16, wherein the powered saw further comprises a shoe;
wherein the first integrally molded housing part comprises a first part of an upper housing portion and a first part of a lower housing portion;
wherein the second integrally molded housing part comprises a second part of the upper housing portion and a second part of the lower housing portion
wherein the motor is contained in the upper housing portion;
wherein the lower housing portion is located between the upper housing portion and the shoe; and
wherein the blade storage compartment is formed in the lower housing portion.

18. The powered saw of claim 17, wherein the blade is held in the blade storage compartment by a frictional fit.

19. The power tool of claim 18, wherein the lower housing portion includes a through hole in which the blade is visible when stored in the blade storage compartment.

20. The power tool of claim 15, wherein the lower housing portion includes a through hole in which the blade is visible when stored in the blade storage compartment.

* * * * *